United States Patent
Poscher et al.

(10) Patent No.: US 11,875,688 B2
(45) Date of Patent: Jan. 16, 2024

(54) FLIGHT POLICY QUERY AT ROAMING

(71) Applicant: Telefonaktiebolaget LM Ericsson (publ), Stockholm (SE)

(72) Inventors: Jens Poscher, Aachen (DE); Ralph Detke, Herzogenrath (DE); Stefan Eichinger, Pulheim (DE); Pedro Tercero, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 594 days.

(21) Appl. No.: 16/763,252

(22) PCT Filed: Nov. 23, 2017

(86) PCT No.: PCT/EP2017/080246
§ 371 (c)(1),
(2) Date: May 12, 2020

(87) PCT Pub. No.: WO2019/101323
PCT Pub. Date: May 31, 2019

(65) Prior Publication Data
US 2021/0074169 A1 Mar. 11, 2021

(51) Int. Cl.
*G08G 5/00* (2006.01)
*B64C 39/02* (2023.01)
(Continued)

(52) U.S. Cl.
CPC ......... *G08G 5/0039* (2013.01); *B64C 39/024* (2013.01); *G08G 5/0069* (2013.01);
(Continued)

(58) Field of Classification Search
CPC .................................................. G08G 5/0039
See application file for complete search history.

(56) References Cited

U.S. PATENT DOCUMENTS 9,601,022 B2 * 3/2017 Taveira ................ G08G 5/0039
9,734,723 B1   8/2017 Bruno et al.
(Continued)

FOREIGN PATENT DOCUMENTS

CN   106023657 A   10/2016
CN   107153425 A    9/2017
(Continued)

OTHER PUBLICATIONS

Google Patents for European Patent Application Pub. No. EP3251108B1 to Taveira that was filed in 2015 (hereinafter "Taveira") (Year: 2015).*

*Primary Examiner* — Jean Paul Cass
(74) *Attorney, Agent, or Firm* — COATS & BENNETT, PLLC

(57) ABSTRACT

A system, method, node, and computer program for determining a flight start policy to be applied to an unmanned aerial vehicle, UAV, (10) is described. The UAV (10) is associated with a first UAV-Application Server, UAV-AS (100) maintaining a flight policy applicable for the geographical service area (150) where the UAV (10) is located. The method comprising the first UAV-AS (100) determining whether the UAV (10) is going to leave the geographical service area (150) towards a second geographical service area (150), wherein the second geographical service area (150) is associated with a second UAV-AS (130). If so querying by the first UAV-AS (100) a flight policy applicable for the second geographical service area (150) from the second UAV-AS (130), and instructing a received flight policy applicable for the second geographical service to the UAV (10), before the UAV (10) has entered the second geographical service area (150).

20 Claims, 9 Drawing Sheets

(51) Int. Cl.
*H04W 48/16* (2009.01)
*B64U 10/13* (2023.01)

(52) U.S. Cl.
CPC ............ *H04W 48/16* (2013.01); *B64U 10/13* (2023.01); *B64U 2201/00* (2023.01)

(56) References Cited

U.S. PATENT DOCUMENTS

| | | | |
|---|---|---|---|
| 10,223,921 B2* | 3/2019 | Navarro Felix | G08G 5/0039 |
| 10,298,674 B2* | 5/2019 | Raghupathy | H04L 67/1061 |
| 11,474,539 B2* | 10/2022 | Mahkonen | G08G 5/0039 |
| 2011/0130918 A1 | 6/2011 | Kim et al. | |
| 2016/0140851 A1* | 5/2016 | Levy | G08G 5/0013 |
| | | | 701/410 |
| 2016/0240087 A1 | 8/2016 | Kube et al. | |
| 2016/0291588 A1* | 10/2016 | Ashoori | G08G 5/0026 |
| 2017/0178518 A1 | 6/2017 | Foladare et al. | |
| 2017/0205827 A1* | 7/2017 | Rezvani | G08B 13/1965 |
| 2017/0243494 A1 | 8/2017 | Taveira | |
| 2017/0308085 A1* | 10/2017 | Hall | G08G 5/0013 |
| 2017/0318417 A1 | 11/2017 | Kusumoto et al. | |
| 2018/0139276 A1 | 5/2018 | Raghupathy et al. | |
| 2018/0253092 A1 | 9/2018 | Trapero Esteban et al. | |
| 2021/0067239 A1* | 3/2021 | Babich | H04L 1/08 |
| 2021/0302955 A1* | 9/2021 | Ponda | G08G 5/0034 |
| 2021/0335136 A1* | 10/2021 | Deseure | G08G 5/003 |
| 2021/0335137 A1* | 10/2021 | Candido | G08G 5/0039 |

FOREIGN PATENT DOCUMENTS

| | | |
|---|---|---|
| CN | 107210000 A | 9/2017 |
| WO | 2017042403 A1 | 3/2017 |
| WO | 2017084031 A1 | 5/2017 |
| WO | 2017177361 A1 | 10/2017 |

* cited by examiner

UAV-AS block flow, policy query

UAV-AS block flow, registration

US 11,875,688 B2

FLIGHT POLICY QUERY AT ROAMING

TECHNICAL FIELD

The present invention relates to flight safety and telecommunications, and in particular to a system, method, node and computer program for determination of a flight policy for a roaming Unmanned Aerial Vehicle.

BACKGROUND

An unmanned aerial vehicle (UAV), commonly known as a drone, is an aircraft without a human pilot aboard, whose flight may either be operated under remote control by a human operator or autonomously by onboard computers. Nowadays, UAVs have been adopted for a wide variety of applications. While, originally, UAVs have mainly been used for military applications, their use has rapidly been expanded to other applications over the recent years, including applications for surveillance, peacekeeping, scientific research and commercial uses, such as in agriculture, product deliveries in logistics, aerial photography, etc.

On flight, UAVs may be connected to application servers that are part of ground based control systems for flight safety via communication systems, such as cellular networks. Application servers may be run by UAV manufacturers, UAV operator, or other authorities for the purpose of controlling and tracing the UAVs, for example. Each UAV manufacturer or authority may run its own application server and UAVs can connect to these servers via default Internet connections over-the-top (OTT, thus as transparent payload for the network operator) of the cellular network by using an integrated cellular communication module. Although usage of UAVs is regulated in most countries, UAV usage cannot be monitored and enforced by central agencies, such as central flight regulation authorities or flight safety authorities, in order to restrict flight spaces or travel speeds and/or to manage flight paths, e.g., to provide secure travel paths for delivery services.

Here a dedicated UAV Application Server, UAV-AS, is assumed that shall be used by any UAV using a cellular network when the UAV is turned-on. The UAV-AS is under the administrative domain of the network operator and is automatically discovered. An UAV connects to a UAV-AS when the UAV is taken into service.

Flight regulation may differ in real-time depending on different geographical locations of the UAV or when certain borders are crossed. For example, the UAV is flying from one country to another (e.g. delivery service), or from unrestricted air space in a country to a restricted are (e.g. a city, stadium, military area, or other limited air space).

Flight Policies such as flight restrictions (night flight not allowed, flight space restricted etc.) must be ensured at all times before crossing a border and entering that air space.

SUMMARY

Accordingly, there is a need for a technique which allows to determine a current flight policy applicable to a neighboring geographical area already before the UAV is entering that area.

This object is achieved by the independent claims. Advantageous embodiments are described in the dependent claims.

According to a first aspect of the invention, a method in a first unmanned aerial vehicle application server, UAV-AS, for determining a flight policy to be applied to an unmanned aerial vehicle, UAV, is provided. The UAV is associated with the first UAV-AS and the first UAV-AS is maintaining a flight policy applicable for the geographical service area where the UAV is located. The method comprises determining, by the first UAV-AS, whether the UAV is going to leave the geographical service area towards a second geographical service area, wherein the second geographical service area is associated with a second UAV-AS, and querying, by the first UAV-AS, a flight policy applicable for the second geographical service area from the second UAV-AS. The method further comprises instructing, by the first UAV-AS, the flight policy applicable for the second geographical service to the UAV, before the UAV has entered the second geographical service area.

According to a further exemplary aspect of the invention, a method in an unmanned aerial vehicle application server, UAV-AS, acting as superior UAV-AS, for determining a flight policy to be applied to an unmanned aerial vehicle UAV, is provided. A plurality of UAV-AS are arranged in a hierarchical structure comprising a subordinate layer and at least one superior layer, a superior layer being a subordinate layer to a next higher superior layer, the subordinate layer comprising a plurality of UAV-AS acting as subordinate UAV-AS, the superior layer comprising one or more UAV-AS acting as superior UAV-AS, wherein the UAV-AS are arranged in the hierarchical structure such that each subordinate UAV-AS is tied to one superior UAV-AS. The method comprises receiving, by the superior UAV-AS, a request from a subordinate UAV-AS, wherein the request comprises an indication of a geographical service area the subordinate UAV-AS is maintaining a flight policy for, and determining, by the superior UAV-AS, a list of subordinate UAV-AS that are tied to geographical service areas that are neighboring to the received geographical service area. The method further comprises returning, by the superior UAV-AS, the determined list of subordinate UAV-AS to the requesting subordinate UAV-AS, thereby enabling the requesting subordinate UAV-AS to query a flight policy from any of the subordinate UAV-AS on the list.

According to a further exemplary aspect of the invention, an unmanned aerial vehicle application server, UAV-AS, for determining a flight policy to be applied to an unmanned aerial vehicle, UAV, is provided. The UAV is associated with the UAV-AS and the UAV-AS is maintaining a flight policy applicable for the geographical service area where the UAV is located. The UAV-AS is adapted to determine whether the UAV is going to leave the geographical service area towards a second geographical service area, wherein the second geographical service area is associated with a further UAV-AS; and to query a flight policy applicable for the second geographical service area from the further UAV-AS. The UAV-AS is further adapted to instruct the flight policy applicable for the second geographical service to the UAV, before the UAV has entered the second geographical service area.

According to a further exemplary aspect of the invention, an unmanned aerial vehicle application server, UAV-AS, acting as superior UAV-AS, for determining a flight policy to be applied to an unmanned aerial vehicle UAV is provided. A plurality of UAV-AS are arranged in a hierarchical structure comprising a subordinate layer and at least one superior layer, a superior layer being a subordinate layer to a next higher superior layer, the subordinate layer comprising a plurality of UAV-AS acting as subordinate UAV-AS, the superior layer comprising one or more UAV-AS acting as superior UAV-AS, wherein the UAV-AS are arranged in the hierarchical structure such that each subordinate UAV-AS is tied to one superior UAV-AS. The UAV-AS is adapted to receive a request from a subordinate UAV-AS, wherein the request comprises an indication of a geographical service area the subordinate UAV-AS is maintaining a flight policy for, and to determine a list of subordinate UAV-AS that are tied to geographical service areas that are neighboring to the received geographical service area. The UAV-AS is further adapted to return the determined list of subordinate UAV-AS to the requesting subordinate UAV-AS, thereby enabling the requesting subordinate UAV-AS to query a flight policy from any of the subordinate UAV-AS on the list.

According to a further exemplary aspect of the invention, a system for determining a flight policy to be applied to an unmanned aerial vehicle, UAV is provided. The UAV is associated with first an unmanned aerial vehicle application server, UAV-AS, and the first UAV-AS is maintaining a flight policy applicable for the geographical service area where the UAV is located. The system comprises a plurality of UAV-AS acting as subordinate UAV-AS, one or more UAV-AS acting as superior UAV-AS, and a plurality of UAV. A plurality of UAV-AS are arranged in a hierarchical structure comprising a subordinate layer and at least one superior layer, a superior layer being a subordinate layer to a next higher superior layer, the subordinate layer comprising the plurality of UAV-AS acting as subordinate UAV-AS, the superior layer comprising the one or more UAV-AS acting as superior UAV-AS, wherein the plurality of UAV-AS are arranged in the hierarchical structure such that each subordinate UAV-AS is tied to one superior UAV-AS.

Also provided is a computer program product comprising program code portions to perform the steps of any of the methods presented herein when executed on one or more processors. The computer program product may be stored on computer readable recording medium such as a semiconductor/flash memory, DVD, and so on. The computer program product may also be provided for download via a communication connection.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular, but not exclusive embodiments, illustrated by way of non-limiting examples in the accompanying drawings, wherein:

FIG. 2 shows a signaling flow for querying a flight policy applicable for a neighboring service area from a neighboring UAV-AS;

FIG. 3 shows a signaling flow for an example neighbor discovery procedure, embedded in a registration procedure of a UAV-AS;

FIGS. 7a and 7b show an exemplary modular function composition of a computing unit configured to execute a UAV-AS and an exemplary modular function composition of a computing unit configured to execute a superior UAV-AS according to the present disclosure and a corresponding method which may be performed by UAV-AS and superior UAV-AS;

DETAILED DESCRIPTION

Figure 1A:
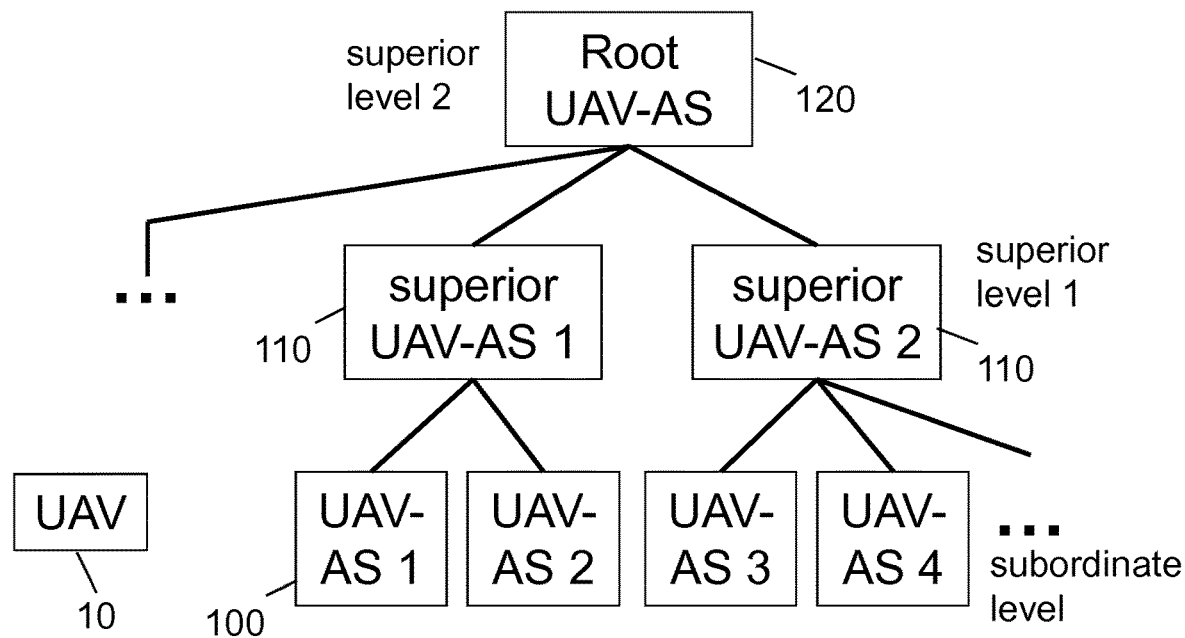
FIG. 1a shows a diagram illustrating a hierarchical system of UAV-AS comprising a subordinate layer and two superior layers, superior layer 1 and the superior layer 2 being the so called root.

In the following description, for purposes of explanation and not limitation, specific details are set forth in order to provide a thorough understanding of the present disclosure. It will be apparent to one skilled in the art that the present disclosure may be practiced in other implementations that depart from these specific details. For example, while the following implementations will be described with regard to LTE and 5G architectures, it will be understood that the present disclosure shall not be limited to these architectures and that the technique presented herein may be practiced with other cellular network architectures as well.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Within the context of the present application, the term "Unmanned Aerial Vehicle", or UAV in short, refers to an automatic machine that can move in any given environment. UAV is considered synonym with "drone", or "mobile robot". Mobile robots have the capability to move around in their environment, thus they are not fixed to one physical location. In contrast, industrial robots usually consist of a jointed arm (multi-linked manipulator) and gripper assembly (or end effector) that is attached to a fixed surface. A mobile robot may be classified by the environment in which it moves:

Land or home robots are usually referred to as Unmanned Ground Vehicles. They are most commonly wheeled or tracked, but also include legged robots with two or more legs (humanoid or resembling animals or insects).

Aerial robots are usually referred to as Unmanned Aerial Vehicles.

Underwater robots are usually called Autonomous Underwater Vehicles or Unmanned Submarine Vessel.

Water surface based mobile robots are usually referred to as Unmanned Marine Vehicles.

The above listed vehicles are the types of vehicles that move autonomously, so without human pilot, on a programmed or instructed path or towards an instructed geographical position/destination, or may also be steered and controlled remotely. The vehicle may also carry human passengers, but wherein none of these passengers would be involved in steering the vehicle. The vehicle may comprise a pilot or driver, but the vehicle would operate in an autonomous movement mode where the driver or pilot is released from the actual steering task. Autonomous driving of a car or auto-pilot flight mode in aircrafts or ships would also be examples covered by the term UAV.

These vehicles could operate respectively in the air, on land, underground, on sea and inland waters, in space or even on other planets/asteroids. The vehicles have an own engine respectively jet, propeller, wheel, crawler track, propeller screw, or hover propulsion and gear. The vehicles have the ability of exchanging data with each other and/or to a controlling base wirelessly. A ground based cellular or wireless communication network may be employed to enable such data exchange. Such a communication network may be run by a mobile operator and thus a communication between a UAV and a controlling ground station may take place using the data communication services of that communication network.

UAV may be deployed for transportation of goods, e.g. for delivery of parcels from a reseller or shop to the end customer. They may also be used for postal services or mail delivery.

Within the context of the present application, the term "geographical service area" or "service area" refers to a region under a common administration/authority. In the context of UAV and flight policies, this refers to a geographical area where a certain flight policy, or access policy, is applicable. Such flight policy is typically issued by an authorized (e.g. governmental) office/agency being responsible for a save and controlled usage of mobile drones or UAVs in that region (flight safety authority).

Such a geographical service area would be characterized by the applicable flight policy being deposited in an application server, AS, and thereby made accessible for anyone deploying UAVs in that region. The AS may be physically located in that area, or may be centralized (instantiated) somewhere in a remote/central data center (e.g. in a "cloud"), or may be implemented by a virtual network function. Even if the AS (or AS instance) may be distant to the geographical service area, still the geographical service area would be tied to one (logical) AS (instance), thus the AS can be queried for getting access to the applicable flight policy.

Typically, such authorized (e.g. governmental) office/agency takes autonomous decisions on local flight policies in accordance with the local legislation. Flight policies may also comprise UAV categories (e.g. weight classes), dynamic policies (e.g. depending on time of the day or flight density in that area), or may consider access priorities (e.g. premium delivery service, or emergency/disaster recovery services).

A geographical service area may also be composed of one or more sub-areas of different nature. Although the geographical service area as such is a legislative region (where a flight policy is applicable), such sub-areas may be radio coverage areas used in the cellular/wireless communication network such as tracking areas, radio cells, location areas, routing areas, or segments of a grid defined by e.g. GPS coordinates.

Within the context of the present application, the term "cellular network" may denote a wireless communication network, or particularly denote a collection of nodes or entities, related transport links, and associated management needed for running a (communication) service, for example a wireless telephony service or a wireless packet transport service. Depending on the service, different node types or entities may be utilized to realize the service. A network operator owns the cellular network and offers the implemented services to its subscribers. Typical components of a wireless communication network are radio access network (such as 2G, GSM, 3G, WCDMA, CDMA, LTE, 5G, WLAN, Wi-Fi), mobile backhaul network, and core network (such as PS Core, EPC, 5G Core).

Within the context of the present application, the term "hierarchical structure" of network elements refers to an arrangement of these network elements in which the items are represented as being "above", "below", or "at the same layer as" one another. Hierarchy may comprise several layers. Certain terminology is tied to a hierarchical structure. Superior refers to a higher layer or an object ranked at a higher layer (parent or ancestor), so being "above". Subordinate refers to a lower layer or an object ranked at a lower layer (child or descendent), so being "below". Peer refers to an object with the same rank, thus "at the same layer".

In a multi-layered hierarchical structure, the terms superior and subordinate are universally applicable. E.g. in a three layered hierarchical structure, there would be a "bottom" layer, a "top" layer, and a "middle" layer between those. For an element on the bottom layer, an element on the middle layer would be superior. At the same time, for an element on the middle layer, an element on the top layer would also be superior. This applies also for the downward direction: For an element on the top layer, an element on the middle layer would be subordinate. At the same time, for an element on the middle layer, an element on the bottom layer would also be subordinate.

Thus, superior refers to an element on "layer+1", and subordinate refers to an element "layer−1". This also means that the top layer element has no superior element, and there is just one single element on that layer. An element on the bottom layer has no subordinate element, and this layer comprises typically the most elements.

A key characteristic of a hierarchical structure is that each element is tied to only one (superior) element on the next higher layer, with the exception of the top layer, which is therefore also called "root". The other way around, an element on a layer other than the bottom layer, sees one or more (subordinate) elements that are tied to him.

Now referring to FIG. 1a, this figure shows a diagram illustrating an example of a hierarchical system of UAV-AS elements.

A hierarchical system may comprise two or more layers. This figures sketches an example having three layers, a bottom layer comprising UAV-AS 1 to 4, a middle layer comprising two superior UAV-AS 1 and 2, and a top (or root) layer comprising a root UAV-AS. Each UAV-AS is tied to one UAV-AS on the next superior layer (except the top layer). For example, UAV-AS 1 100 is tied to a superior UAV-AS 1 110. UAV-AS 4 100 is tied to a superior UAV-AS 2 110. Both, superior UAV-AS 1 and 2 are tied to the top layer root UAV-AS 120.

As indicated in the figure, superior UAV-AS 2 may have connections to more than 2 subordinate UAV-AS. Also the single root layer UAV-AS may be connected to more than 2 UAV-AS on the middle layer.

A UAV 10 discovers and connects to a single UAV-AS 100 when the UAV is turned-on. A UAV 10 would not connect to a UAV-AS on the middle or top layer.

Figure 1B:
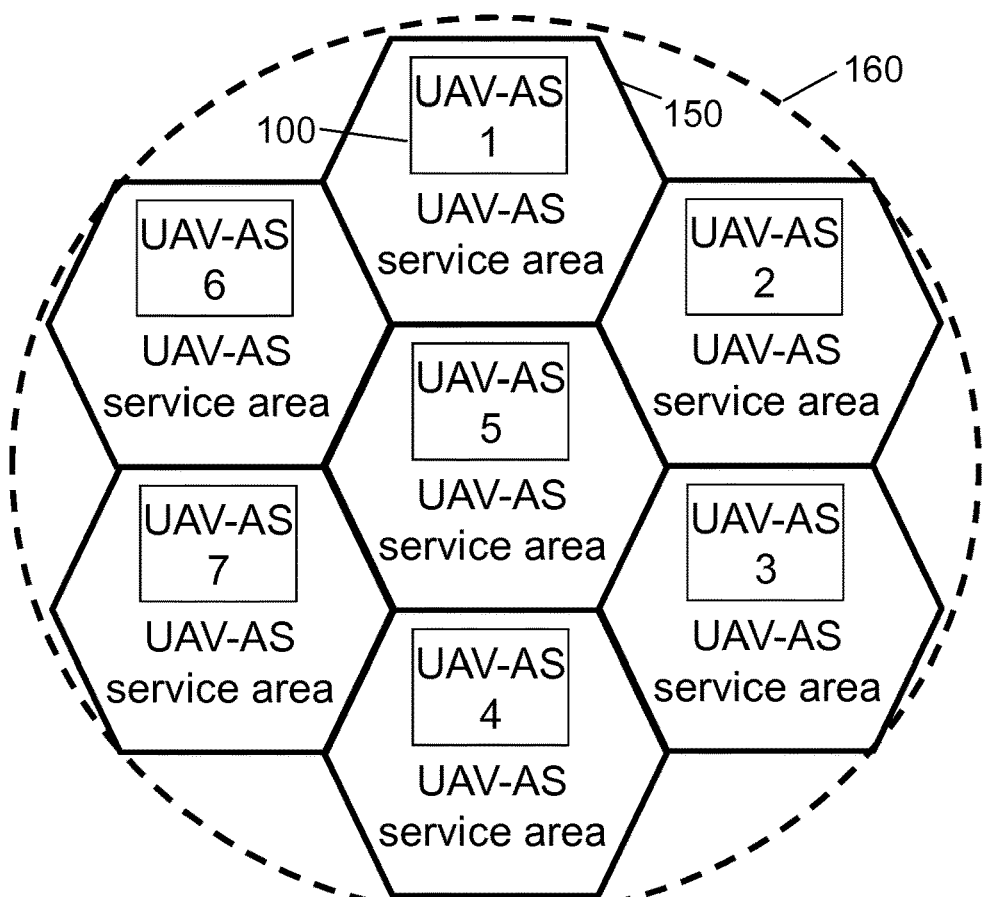
FIG. 1b shows a diagram illustrating a geographical mapping of areas into service areas that are under administration of a UAV-AS, and a grouping of several service areas into a global service area.

Now referring to FIG. 1b, this figure shows a diagram illustrating a geographical mapping of areas into service areas that are under administration of a UAV-AS, and a grouping of several service areas into a global service area.

A UAV-AS 100 is assumed to be responsible for a geographical area, here called UAV-AS service area 150 covering a certain geographical area. The UAV-AS 100 maintains a flight policy applicable for all UAV 10 being present in that geographical area the UAV-AS 100 is responsible for (i.e. the service area).

The UAV 10 may be residing in a cellular network comprising a plurality of radio coverage areas and the geographical service area 150 is composed of one or more radio coverage areas used in the cellular network.

The geometrical shape of a UAV-AS service area 150 may depend on different factors. A basic shape would be a circle or elliptical shape. However, it is assumed that an entire geographical area (e.g. a country) is subject to a one or more flight policies, and that if a UAV 10 is leaving a first service area, it immediately enters a second service area. The geometrical shape that best covers a larger region would be a square/rectangle or a hexagonal shape. For this reason, this figure sketches a scenario where the service area would be hexagonal shaped.

A service area may also be composed of one or more radio coverage areas used in the cellular network such as tracking areas, radio cells, location areas, routing areas, or grids segments. In this case, the shape of the underlying radio coverage areas may implicitly determine the shape of the service area, and is determined by radio wave propagation in a real world condition.

If a superior UAV-AS 110 has more than one subordinate UAV-AS 100, the geographical service area of the superior UAV-AS 110 is the geographical service area 160 of a merger of the geographical service areas 150 of all subordinate UAV-AS 100 tied to the superior UAV-AS 110. In this figure, assuming that UAV-AS 1-7 are all tied to a single superior UAV-AS 110, that superior UAV-AS 110 would be responsible for the geographical service area 160 (here simplified as circle shaped).

Figure 2:
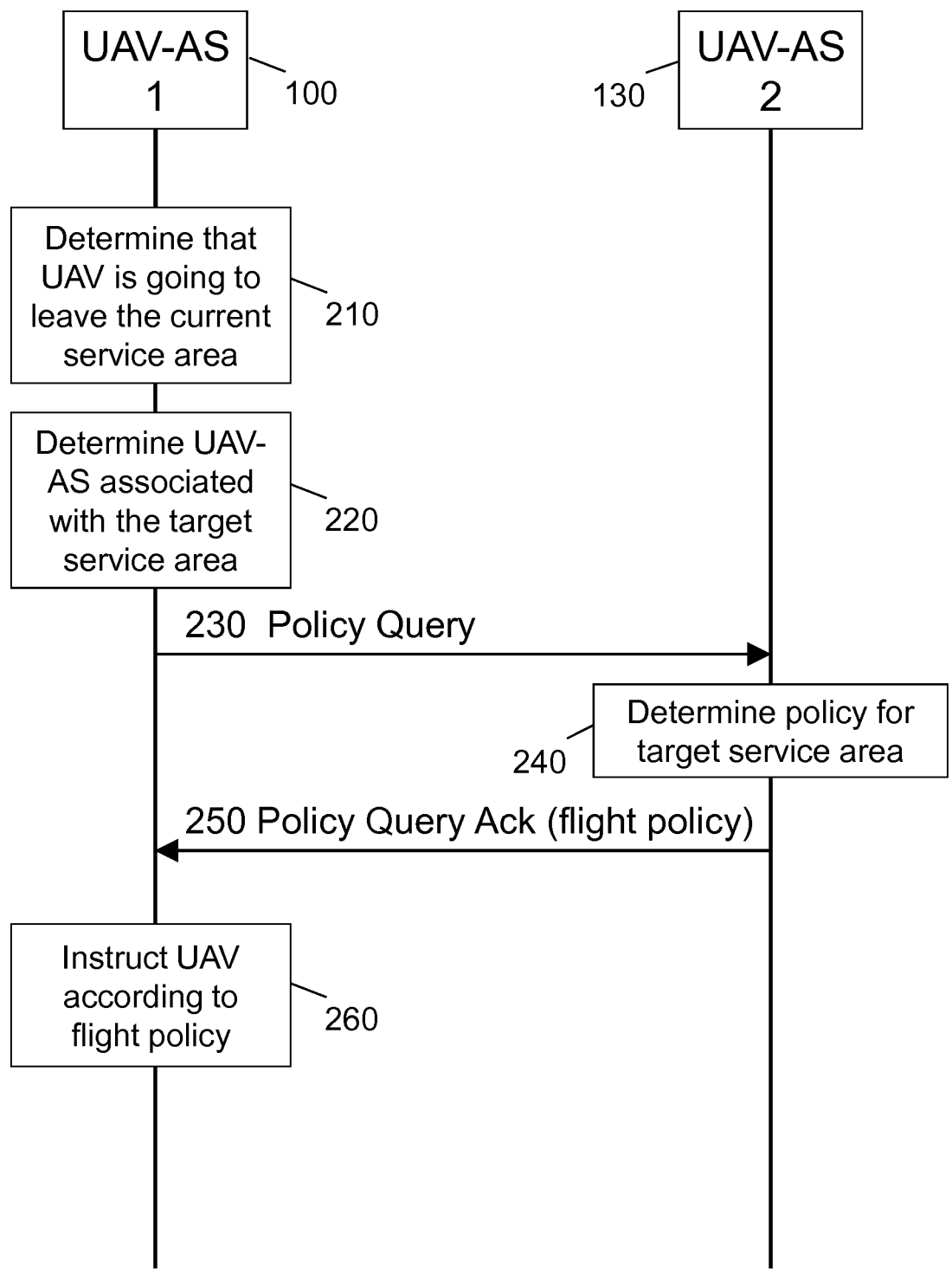

Now referring to FIG. 2, this figure shows a signaling flow for querying a flight policy applicable for a neighboring service area from a neighboring UAV-AS.

In step 210 the UAV-AS 100 is determining that a UAV 10 is about to leave the geographical service area 150 towards a second geographical service area 150. Thus the UAV-AS 100 must instruct the UAV 10 on a flight policy applicable for the targeted second geographical service area 150. The UAV 10 shall be instructed before the UAV 10 has entered the targeted second geographical service area 150. The flight policy applicable for that targeted second geographical service area 150 may imply flight restriction, so the UAV 10 must be instructed already before entering that targeted second geographical service area 150, to enable the UAV 10 to obey such restrictions and for example change the flight path or land in the current geographical service area 150.

When moving from one geographical service area 150 to a further geographical service area 150, the UAV 10 may have to change its connectivity. The geographical service area a UAV-AS is responsible for, may be constructed from one or more radio areas of a wireless network. The UAV may comprise a radio module (and a type of subscriber identity module, SIM, card) which may be used to register the UAV 10 into the wireless network. After successful registration, the UAV 10 may then use the connectivity provided by the wireless network for its communication with the UAV-AS.

When moving into a new geographical service area, the UAV 10 may have to disconnect from the former wireless network first, and then register into a wireless network available at the new geographical service area. This change may cause a small interruption in connectivity when entering the new geographical service area, and thus the UAV 10 must be instructed on the applicable flight policy in that geographical service area, before moving into that new geographical service area.

The flight policy for the targeted second geographical service area 150 is maintained by a second UAV-AS 130. The second UAV-AS 130 may be using the same logic and implementation as the first UAV-AS 100, thus the second UAV-AS 130 may also be a UAV-AS 100 but operating in a flight policy delivery mode and responding to query messages. Only for the sake of clarity, the second UAV-AS is referred to by label 130.

The UAV-AS 100 may determine the second geographical service area 150 based on flight path information applicable for the UAV 10. The UAV-AS 100 may receive such flight path information applicable for the UAV 10 from the UAV 10. In this case the UAV 10 may provide such information to the UAV-AS, for example when entering a new geographical service area. By alternative, the UAV-AS 100 may receive the flight path information applicable for the UAV 10 from an operator operating the UAV 10. In this case the operator operating the UAV 10 may inform beforehand the responsible UAV-AS along a scheduled flight path.

In step 220 the UAV-AS 100 then determines the second UAV-AS 130 associated with the targeted geographical service area 150. Then the UAV-AS 100 queries a flight policy applicable for the targeted geographical service area 150 from the determined second UAV-AS 130.

The UAV-AS 100 may determine the second UAV-AS 130 by performing a neighbor discovery before the UAV 10 has entered the second geographical service area 150. The neighbor discovery may be a look-up in a database comprising information on an association of a UAV-AS 100 with a geographical service area 150. An alternative method of neighbor discovery is sketched in FIG. 3 and described there.

Such neighbor discovery may be done independently from the supervision of UAV 10 flight paths, as a stand-alone operation done and repeated at certain periodic intervals, or may be done during start-up of the UAV-AS 100. The important assumption is that the neighboring UAV-AS 130 are known in the UAV-AS 100 when the UAV-AS 100 determines that a UAV 10 is going to leave the current geographical service area 150.

In order to determine the flight policy applicable for the targeted second geographical service area 150, the UAV-AS 100 sends a policy query request message 230 to this determined second UAV-AS 130 associated with the targeted geographical service area 150.

The target UAV-AS 130 receives in message 230 a query message requesting a flight policy. The target UAV-AS 130 then in step 240 determines the applicable flight policy for the own geographical service area 150. In message 250 the target UAV-AS 130 returns the determined flight policy to the requesting UAV-AS 100.

The UAV-AS 100 receives in step 250 the flight policy from the target UAV-AS 130. In step 260 the UAV-AS 100 instructs the UAV 10 according to the received flight policy applicable for the second geographical service area 150 before the UAV 10 has entered the second geographical service area 150.

A flight policy may comprise restrictions in respect of operation and/or movement of the UAV 10. A restriction in UAV movement may comprise one or more of: applicable speed limits, yield rules, flight height restrictions, flight path restrictions, flight noise restrictions. These may either on a permanent level, or for given restriction times. Flight policies may also be applicable for certain UAV categories (e.g. weight classes, sizes, noise classes, payload classes), be of dynamic nature or temporary, e.g. depending on time of the day, UAV flight density in that area, or may consider access/flight priorities, e.g. premium delivery service, or emergency/disaster recovery services.

Instructing a UAV 10 may comprise that the responsible UAV-AS 100 sends the applicable flight restriction to the UAV 10 corresponding to the applicable flight policy, so leaving it up to the UAV 10 to take appropriate actions to comply with the flight policy/restrictions. Thus the UAV-AS 100 may instruct the UAV 10 by providing flight instructions corresponding to the flight policy to the UAV 10.

By alternative, the UAV-AS 100 may interpret the flight policy and derive appropriate actions/instructions corresponding to the flight policy. The UAV-AS 100 informs the UAV 10 about the actions to be taken by the UAV 10. In this case the UAV-AS 100 decides on the appropriate actions to comply with the flight policy, and the UAV 10 is expected to follow these actions after being instructed/informed.

Typical actions could be an instruction to land and not enter the targeted second geographical service area 150. Instead of landing, the UAV 10 could be instructed to change the flight path and take a detour via a further geographical service area to reach the destination. In yet another alternative, the UAV 10 could be instructed to enter the targeted second geographical service area 150 at an alternative entry point.

As a last resort, the UAV 10 may be instructed to return to the starting base, for example if no meaningful instruction could be derived as all possible target service areas are restricted, except the one the UAV came from (dead end situation).

Figure 3:
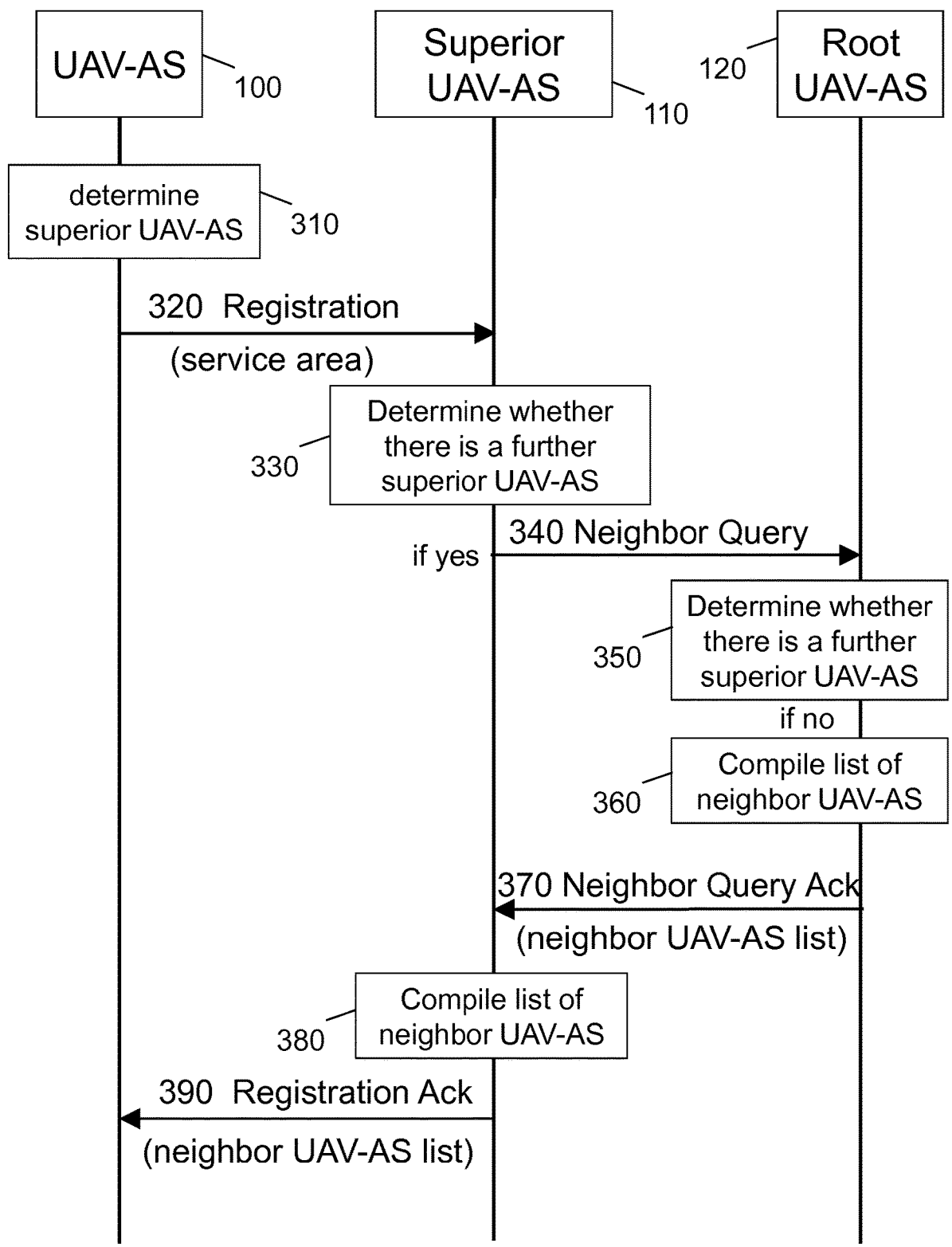

Now referring to FIG. 3, this figure shows an example signaling flow for a neighbor discovery procedure, embedded in a registration procedure of a UAV-AS.

In this example flow, a plurality of UAV-AS 100 are arranged in a hierarchical structure comprising a subordinate layer and at least one superior layer, a superior layer being a subordinate layer to a next higher superior layer, the subordinate layer comprising a plurality of UAV-AS 100 acting as subordinate UAV-AS 100, the superior layer comprising one or more UAV-AS 100 acting as superior UAV-AS 110, wherein the UAV-AS are arranged in the hierarchical structure such that each subordinate UAV-AS 100 is tied to one superior UAV-AS 110.

In such hierarchical architecture a neighbor discovery may be a query for a list of neighboring UAV-AS 100 from a superior UAV-AS 110 tied to the UAV-AS 100. Thus the superior UAV-AS 110 receives a request from a subordinate UAV-AS 100, wherein the request comprises an indication of a geographical service area 150 the subordinate UAV-AS 100 is maintaining a flight policy for.

That request may be a request for registering the requesting UAV-AS 100 as a subordinate UAV-AS 100 to the superior UAV-AS 110.

Thus a subordinate UAV-AS 100 may establish the association of the subordinate UAV-AS 100 with a geographical service area 150 by registering itself towards a superior UAV-AS 110 by indicating a geographical service area 150 the subordinate UAV-AS 100 is handling the flight policy for. Such registration may take place at an initial start of the UAV-AS 100. An established registration, and thereby and established tie to a superior UAV-AS 110, may be reconfirmed/renewed at periodic intervals.

The UAV-AS 100 may perform the neighbor discovery as a part of the registration of the UAV-AS 100 with a superior UAV-AS 110. In this case the UAV-AS 100 receives a list of neighboring UAV-AS 100 from the superior UAV-AS 110. Such list may comprise for each neighboring UAV-AS 100 an indication of the associated geographical service area 150.

The FIG. 3 shows such example where the neighbor discovery procedure is embedded in a registration procedure of a UAV-AS 100. In step 310 the UAV-AS 100 discovers the superior UAV-AS 100. If this is an initial start, the UAV-AS 100 may determine the superior UAV-AS 110 by look-up in a database, a DNS query based on a well-known name, or based on administration in the UAV-AS 100.

In step 320 the UAV-AS 100 sends a registration request message to the determined superior UAV-AS 110. This request comprises an indication of the own geographical service area 150.

The superior UAV-AS 110 receives a registration request message 320 from a subordinate UAV-AS 100 comprising an indication of a geographical service area 150 the requesting UAV-AS 100 maintains a flight policy for. In step 330 the superior UAV-AS 110 determines its own position in the hierarchy, so whether there is still a further superior UAV-AS 110 on a layer above. In this example (aligned with FIG. 1*a*) the answer is 'yes', so there is still the root UAV-AS 120 above. As the role of the UAV-AS typically does not change, this determination step may be done just once and is then not repeated at every registration request message.

In step 340 the superior UAV-AS 110 sends a neighbor query request message to the root UAV-AS 120. This message may comprise an indication of the service area to be registered as received in message 320.

The root UAV-AS 120 receives in step 340 a neighbor query request message, the message may comprise an indication of a service area. In step 350 the root UAV-AS 120 determines its own position in the hierarchy, so whether there is still a further superior UAV-AS 110 on a layer above. In this example (aligned with FIG. 1*a*) the answer is 'no, as this is already the root UAV-AS 120 and there is no UAV-AS above. As above, this step may also be executed just once.

Then the root UAV-AS 120 compiles in step 360 a list of neighboring UAV-AS being neighboring to the indicated service area. After completion of the list of neighboring UAV-AS, the root UAV-AS 120 returns that list in a neighbor query response message 370 to the requesting superior UAV-AS 110 on the layer below.

The superior UAV-AS 110 receives the list of neighboring UAV-AS being neighboring to the indicated service area in a neighbor query response message 370.

In step 380 the superior UAV-AS 110 compiles the complete list of neighboring UAV-AS. This complete list comprises the UAV-AS from the list as received in message 370 from the root UAV-AS 120, and in addition UAV-AS that the superior UAV-AS 110 determines as being neighboring to the indicated service area but that are not part of the list received in message 370. This may be the case for example if the registering service area is at an international border and the root UAV-AS 120 would provide a list of UAV-AS that are neighboring in the other country, and the superior UAV-AS 110 would complement that list with the UAV-AS that are neighboring in the own country. Thus superior UAV-AS 110 determines a list of subordinate UAV-AS 100 that are tied to geographical service areas 150 that are neighboring to the received geographical service area 150.

Finally, in step 390 the superior UAV-AS 110 returns the determined list of subordinate UAV-AS 100 to the requesting subordinate UAV-AS 100, thereby enabling the requesting subordinate UAV-AS 100 to query a flight policy from any of the subordinate UAV-AS 100 on the list. Thus the completed list of neighboring UAV-AS is returned to the requesting UAV-AS 100 in a registration request response message. The UAV-AS 100 then receives that list of neighboring UAV-AS.

The list of neighboring UAV-AS 100, as received from the superior UAV-AS 110, may comprise for each neighboring UAV-AS 100 an indication of the associated geographical service area 150. The receiving UAV-AS 100 stores that list. This stored information may enable the UAV-AS 100 to determine a responsible target UAV-AS 130 when a UAV 10 is leaving the current service area at roaming as shown in step 220 in FIG. 2. Having a list of neighboring UAV-AS at hand, the UAV-AS 100 determines a responsible target UAV-AS 130 and fetches the applicable flight policy for that target service area directly from that responsible UAV-AS 130, using a procedure as shown in FIG. 2.

As an addition (not shown in the figure), a superior UAV-AS 110 may inform all its subordinate UAV-AS 100 if a list of neighboring UAV-AS has changed. For example, if a new subordinate UAV-AS 100 is started up, it registers to the superior UAV-AS 110 as described above. Addition of a new subordinate UAV-AS may have also impacts on the list of neighbor UAV-AS of the other subordinate UAV-AS. Thus after having compiled the list of neighboring UAV-AS, the superior UAV-AS 110 may in addition to sending this list to the newly registering subordinate UAV-AS 100, also send an updated list of neighboring UAV-AS to the other affected subordinate UAV-AS 100.

FIG. 3 sketches an example used if a new subordinate UAV-AS is added. A similar mechanism may be applied if a subordinate UAV-AS is removed or taken out of service. In such a case, the subordinate UAV-AS would send a de-registration message to its superior UAV-AS. The list of neighbor UAV-AS would then be re-built and the remaining subordinate are updated.

Figure 4A:
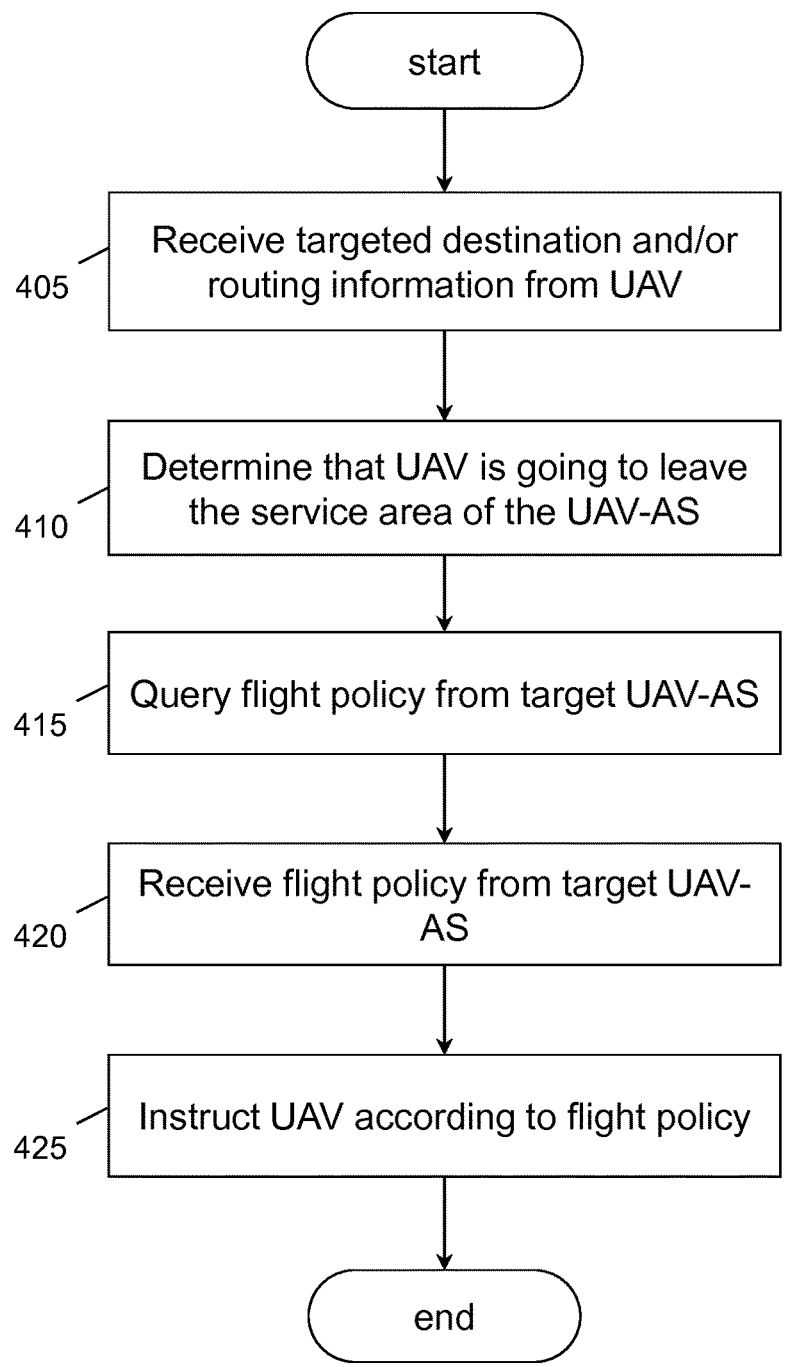
FIG. 4a shows a block diagrams illustrating a UAV-AS logic of a flight policy query.

Now referring to FIG. 4a, this figure shows a block diagrams illustrating a UAV-AS logic of a flight policy query. This block flow may be used in a subordinate UAV-AS 100 as illustrated in the previous figures.

The flow starts in step 405 when the UAV-AS receives an indication of the target destination of a UAV, UAV routing information, or other information indicative for a flight path the UAV is going to take. Based on this information, the UAV-AS determines in step 410 that the UAV is going to leave the current service area towards a further service area. Typically, the further service area is adjacent or neighboring to the current service area. Thus based on the flight information from the UAV, the UAV-AS determines the target service area the UAV is going to enter soon.

Based on the list of neighboring UAV-AS and associated services areas that the UAV-AS has received, for example during registration, the UAV-AS determines the responsible target UAV-AS. In step 415 the UAV-AS determines the flight policy applicable for that target service area. To do this, the UAV-AS sends a flight policy query request message to the responsible target UAV-AS, the UAV-AS maintaining the flight policy for the target service area.

In step 420 the UAV-AS receives a response from the queried target UAV-AS. The response comprises the flight policy applicable for the target service area.

In step 425 the UAV-AS instructs the UAV according to the received flight policy, as already described above.

The UAV-AS may also operate in receiving mode corresponding to this use case (not shown in the flows). In this case the UAV-AS receives a request for the flight policy of the own service area. In this case the UAV-AS determines the applicable flight policy and returns it to the requestor.

Figure 4B:
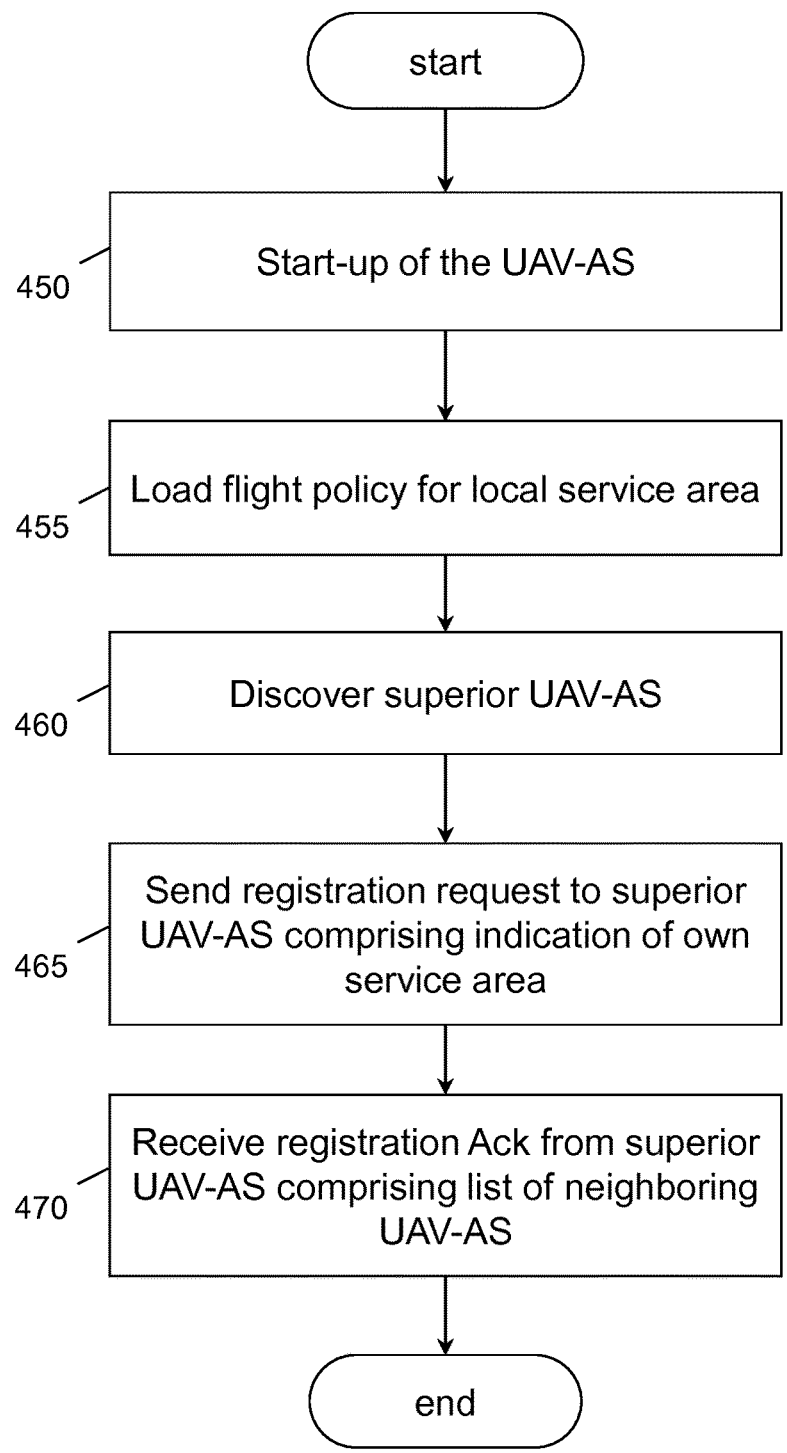
FIG. 4b shows a block diagrams illustrating a UAV-AS logic of a neighbor discovery embedded in a registration procedure.

Now referring to FIG. 4b, this figure shows a block diagrams illustrating a UAV-AS logic of a neighbor discovery embedded in a registration procedure. This block flow may be a used in a subordinate UAV-AS 100 as illustrated in the previous figures.

The flow starts in step 450 when the UAV-AS is started-up. The flow may also be triggered at periodic intervals, or if there are changes in the geographical coverage of the service area.

In step 455 the UAV-AS loads a flight policy for the own/local geographical service area. This may be done by administration by the network operator, or by uploading the flight policy into a memory/storage area of the UAV-AS.

In step 460 the UAV-AS discovers a superior UAV-AS. Such discovery of a superior UAV-AS may be by look-up in a database, DNS query based on a well-known name, or by administration in the UAV-AS.

Then in step 465 the UAV-AS sends a registration request message to the discovered superior UAV-AS. The message to the superior UAV-AS comprises an indication of the own service area.

As a response to the registration request message, the UAV-AS receives in step 470 a registration request response message. This may be an acknowledgement to the registration request. As explained above in FIG. 3 step 390, the response message comprises a list of neighboring UAV-AS and information on the service area these are responsible for (i.e. having a flight policy available for query). The receiving UAV-AS stores the received list for later use as described above. This list enables the UAV-AS to fetch a flight policy directly from a responsible neighboring UAV-AS.

Figure 5:
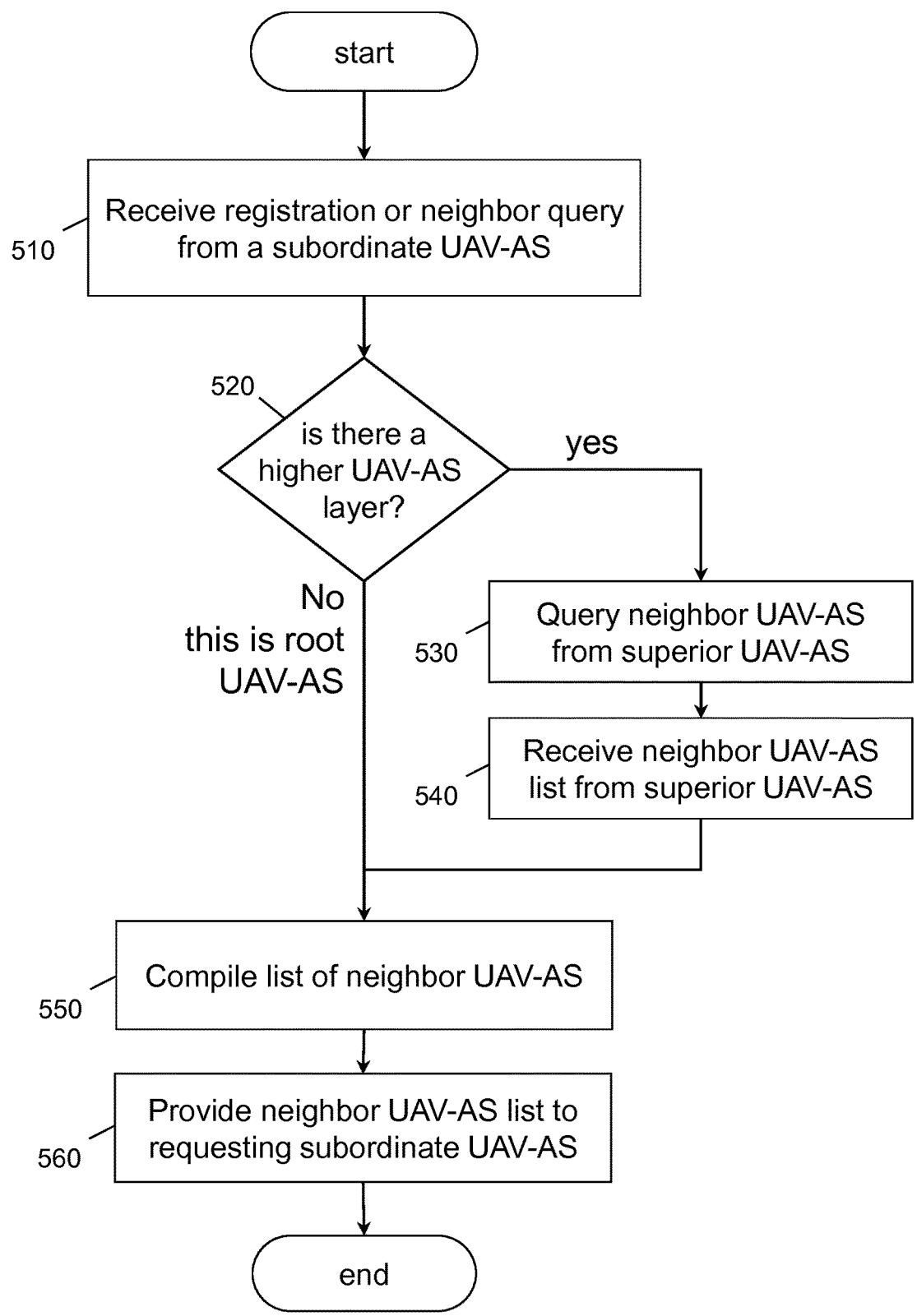
FIG. 5 shows a block diagrams illustrating a superior UAV-AS logic.

Now referring to FIG. 5, this figure shows a block diagrams illustrating a superior UAV-AS logic. This block flow may be used in a superior UAV-AS 110 or root UAV-AS 120 as illustrated in the previous figures. Thus, although the role of a superior UAV-AS 110 and a root UAV-AS 120 are different in respect of their position in a hierarchical structure of UAV-AS, still the block flow of FIG. 5 may be applicable to both roles.

The flow starts in step 510 when the superior UAV-AS receives a registration request message from a subordinate UAV-AS. The flow may also be triggered if the received message is a neighbor query request message from a subordinate UAV-AS.

In step 520 the superior UAV-AS determines its own role in the hierarchy of UAV-AS. So the UAV-AS whether it acts as a superior UAV-AS where there is still a higher layer superior UAV-AS. If the receiving superior UAV-AS is acting as a root UAV-AS, there is no further superior UAV-AS. Thus if the UAV-AS is acting as superior UAV-AS, the flow continues with step 530. If the UAV-AS is acting as root UAV-AS, the flow continues with step 550.

If the UAV-AS is acting as superior UAV-AS, the flow continues with step 530 where the superior UAV-AS sends a neighbor UAV-AS query request message to the next higher layer superior UAV-AS. That query may comprise an indication for the service area in question as received from the subordinate UAV-AS is step 510.

In step 540 the superior UAV-AS receives a response message from the next higher layer superior UAV-AS, wherein that response may comprise a list of neighboring UAV-AS and an indication of the service area these are responsible for.

Next step 550 is performed by the superior UAV-AS. That step may be triggered when the superior UAV-AS has determined its role in the hierarchy as being a root UAV-AS, so the step 520 determines the root role. Alternatively, step 550 may be triggered by a response from a superior UAV-AS on the next higher hierarchy layer providing a list of neighboring UAV-AS as of step 540.

In step 550 the superior UAV-AS compiles a list of neighboring UAV-AS. This may be a new list in case the UAV-AS acts as root UAV-AS, or when acting as superior UAV-AS, complementing a list received form the higher layer superior UAV-AS as described above for FIG. 3 step 380.

Finally, in step 560 the superior UAV-AS returns the compiled list of neighboring UAV-AS to the requesting subordinate UAV-AS. The response message may be a registration request response message such as an acknowledgement, or a neighbor query response message, depending on which message triggered the flow in step 510.

Figure 6A:
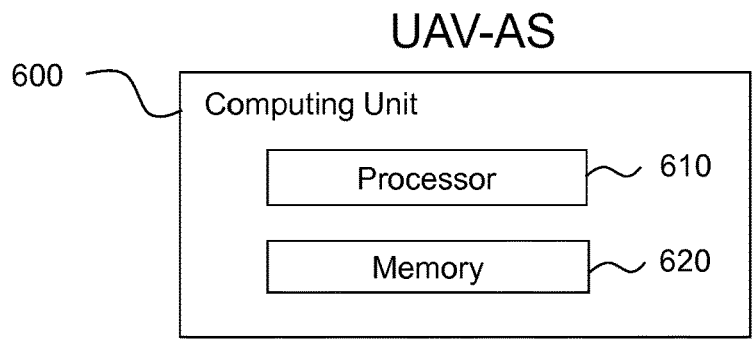
FIGS. 6a and 6b show an exemplary composition of a computing unit configured to execute a UAV-AS according to the present disclosure and an exemplary composition of a superior UAV-AS according to the present disclosure.

Now referring to FIG. 6a, this figure shows an exemplary composition of a computing unit configured to execute a UAV-AS according to the present disclosure. The UAV-AS may be the UAV-AS 100 as shown in the previous figures.

The computing unit 600 comprises at least one processor 610 and at least one memory 620, wherein the at least one memory 620 contains instructions executable by the at least one processor 610 such that the computing unit 600 is operable to carry out the method steps described in FIGS. 4a and 4b with reference to the UAV-AS 100.

Figure 6B:
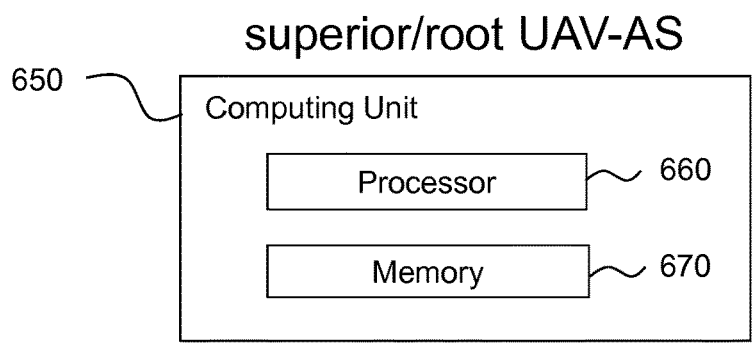

Now referring to FIG. 6b, this figure shows an exemplary composition of a computing unit configured to execute a superior UAV-AS according to the present disclosure. The superior UAV-AS may be the superior UAV-AS 110 or root UAV-AS 120 as shown in the previous figures.

The computing unit 650 comprises at least one processor 660 and at least one memory 670, wherein the at least one memory 670 contains instructions executable by the at least one processor 660 such that the computing unit 650 is operable to carry out the method steps described in FIG. 5 with reference to the superior UAV-AS 110 or root UAV-AS 120.

It will be understood that the computing units 600 and 650 may be physical computing units as well as virtualized computing units, such as virtual machines, for example. It will further be appreciated that the computing units may not necessarily be implemented as standalone computing units, but may be implemented as components —realized in software and/or hardware—residing on multiple distributed computing units as well.

Figure 7A:
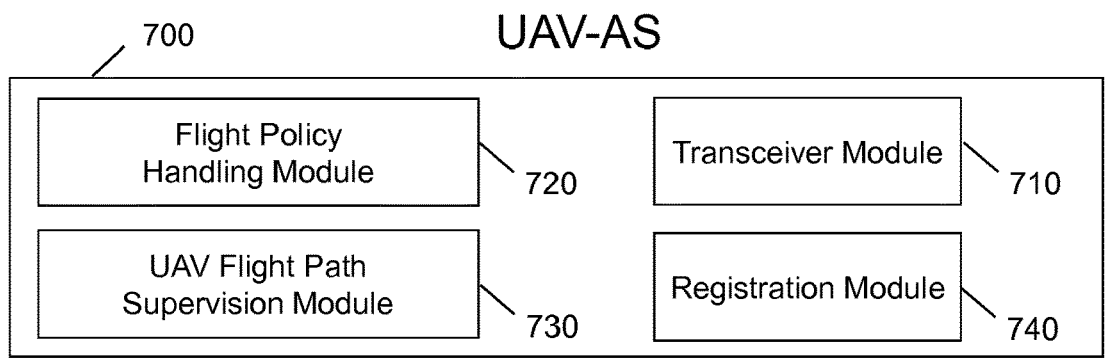

Now referring to FIG. 7a, this figure shows an exemplary modular function composition of a computing unit configured to execute a UAV-AS according to the present disclosure and a corresponding method which may be performed by a UAV-AS, in particular the UAV-AS 100 as presented before.

The Transceiver Module 710 may be adapted to perform reception and sending of signaling messages, such as step 415, 420, 465, 470, and any signaling messages related to the determination of a flight policy for a UAV about to leave a current geographical service area towards a further geographical service area.

The Flight Policy Handling Module 720 may be adapted to maintain a flight policy for the own geographical service area. On request, the Flight Policy Handling Module 720 provides the own flight policy to a requesting neighboring UAV-AS. The reception of a corresponding request and the sending of a response with the flight policy may be done together with the Transceiver Module 710.

The UAV Flight Path Supervision Module 730 may be adapted to supervise the flight of UAV within the own geographical service area. The UAV Flight Path Supervision Module 730 may determine that a UAV is going to leave the own geographical service area and also determine the targeted neighbouring geographical service area as of step 410. The UAV Flight Path Supervision Module 730 may receive information of the flight path of a UAV from the UAV itself or from an operator of the UAV as of step 405. The UAV Flight Path Supervision Module 730 may instruct the UAV on a flight policy or appropriate actions corresponding to a flight policy as of step 425.

The Registration Module 740 may be adapted to handle a registration of the UAV-AS towards a superior UAV-AS. This comprises discovery of a superior UAV-AS as of step 460, sending of a registration request message, step 465, and reception of a corresponding response, step 470. The sending of a request and reception of a corresponding response may be done together with the Transceiver Module 710.

Figure 7B:
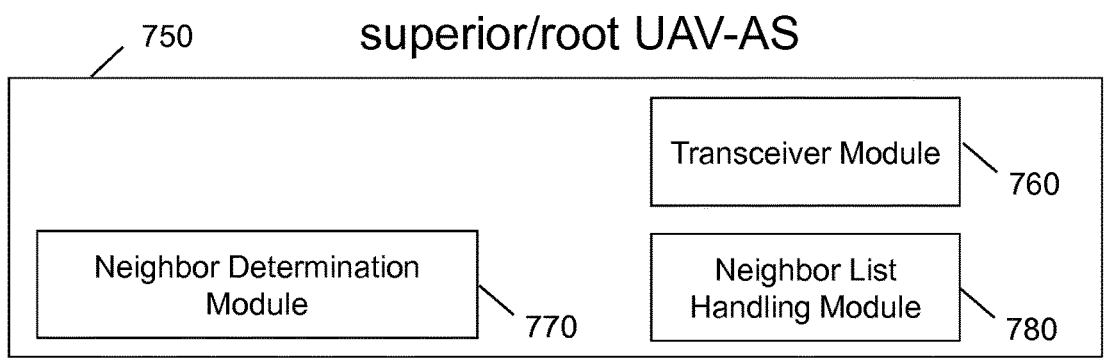

Now referring to FIG. 7b, this figure shows an exemplary modular function composition of a computing unit configured to execute a superior UAV-AS according to the present disclosure and a corresponding method which may be performed by a superior/root UAV-AS, in particular the superior UAV-AS 110 or root UAV-AS 120 as presented before.

The Transceiver Module 760 may be adapted to perform reception and sending of signaling messages, such as step 510, 530, 540, 550, 560, and any signaling messages related to the determination of a neighboring UAV-AS list.

The Neighbour Determination Module 770 may be adapted to compile a list of neighbouring UAV-AS as of step 550. For this the module determines neighbouring services areas in relation to a given service area. Then, for the determined neighbouring services areas, the responsible UAV-AS are determined handling a flight policy for the service area. All this information is then compiled into a list.

The Neighbour List Handling Module 780 may construct a neighbour query request message in order to discover neighbouring UAV-AS from a superior UAV-AS as of steps 530 and to handle a received result comprising a list of neighbouring UAV-AS as of step 540. The sending of a request and reception of a corresponding response may be done together with the Transceiver Module 770.

Figure 8:
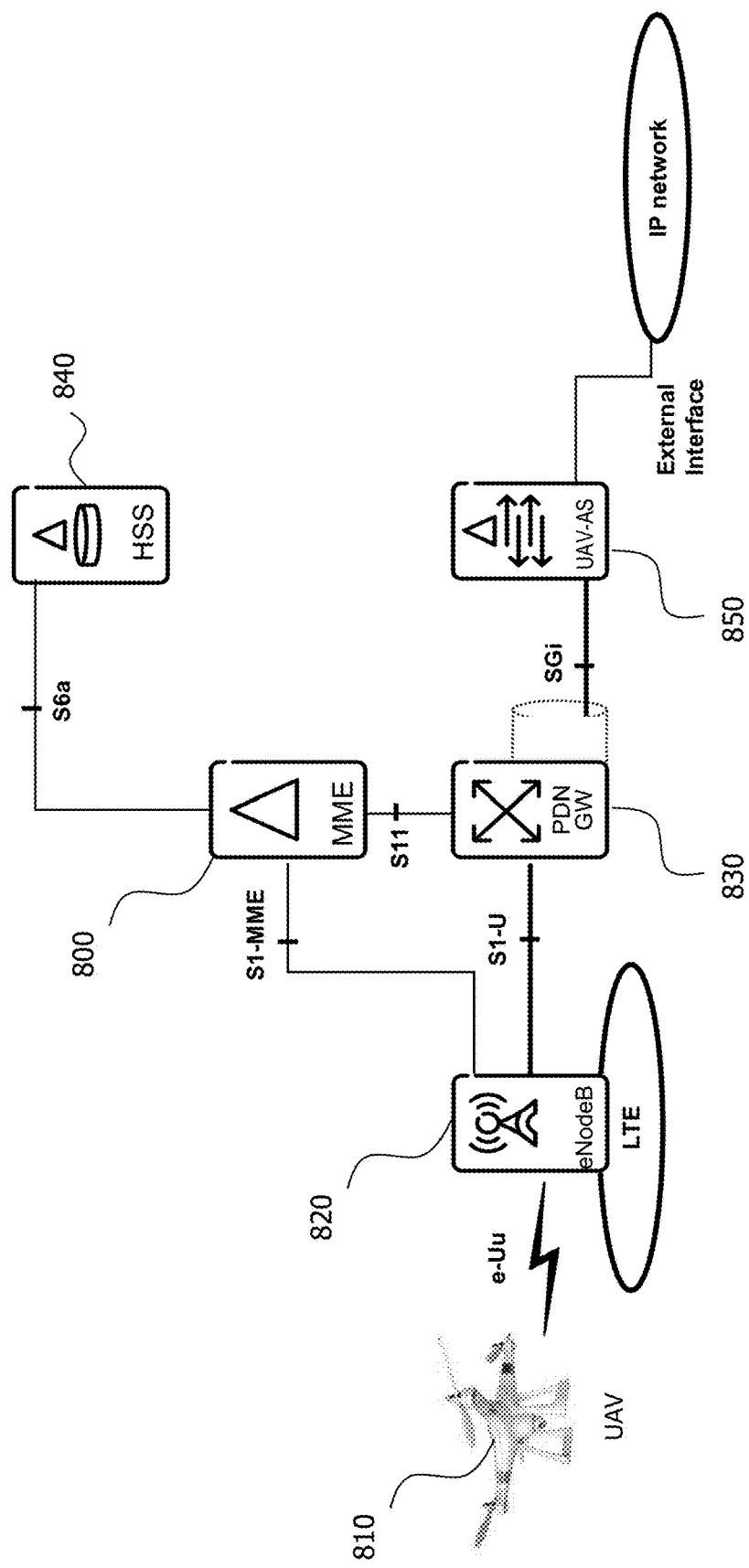
FIGS. 8 and 9 illustrate exemplary cellular network architectures for LTE and 5G including a UAV and UAV-AS, which may be used according to the present disclosure.

Now referring to FIG. 8, this figure illustrates exemplary cellular network architectures for LTE including a UAV and UAV-AS, which may be used according to the present disclosure.

The UAV 10 may be residing in a cellular network comprising a plurality of radio coverage areas and the geographical service area 150 is composed of one or more radio coverage areas used in the cellular network. The cellular network may be an LTE network.

A radio coverage area of an LTE network is based on tracking areas. In such example, the geographical service area a UAV-AS is responsible for, may be constructed from one or more tracking areas of the LTE radio network. The UAV may comprise a LTE-radio module (and a type of subscriber identity module, SIM, card) which is used to register the UAV into the packet core network of the network operator. Once being registered, or as part of the registration procedure, the UAV may discover the UAV-AS being responsible for the current geographical service are. The normal mobility procedures of the packet core network are used to keep track on the mobility of the UAV. This architecture is sketched in FIG. 8 in more detail.

As common LTE architectures, the architecture shown in FIG. 8 comprises an eNodeB 820 through which the UAV 810 may connect to the cellular network using an e-Uu interface. The eNodeB 820 connects to a Mobility Management Entity, MME, 800 for control plane support using an S1-MME interface and to a Packet Data Network Gateway, PDN GW, 830 for user plane support (i.e., for user data transfer) using an S1-U interface. The MME 800, in turn, is connected to a Home Subscriber Service, HSS, 840 containing user-related and subscription-related information via an S6a interface. It will be understood by the skilled person that the architecture shown in FIG. 8 corresponds to a simplified LTE architecture in which only those components that are necessary for the purpose of elucidating the technique presented herein are shown.

In addition to the above-described common entities of an LTE network, the architecture illustrated in FIG. 8 further comprises a UAV application server 850 (denoted as "UAV-AS" in the figure) as part of the cellular communication network. The UAV-AS 850 may correspond to the UAV-AS described in relation to the previous figures. The UAV-AS 850 connects to the PDN GW 830 through an SGi interface and supports an external interface which allows access to functions of the UAV-AS 850 to entities external to the cellular communication network, such as entities accessing the UAV-AS 850 from the Internet, or vice versa, for example.

Using the SGi interface to the packet core network, the UAV-AS can communicate with the UAV and vice versa. This allows to instruct a flight policy or corresponding actions to a UAV and to receive flight path information from the UAV in the UAV-AS. Via the interface to external networks such as the Internet, the UAV-AS is able to retrieve and provide information from an operator of the UAV, or to contact other UAV-AS of a hierarchical UAV-AS architecture.

Figure 9:
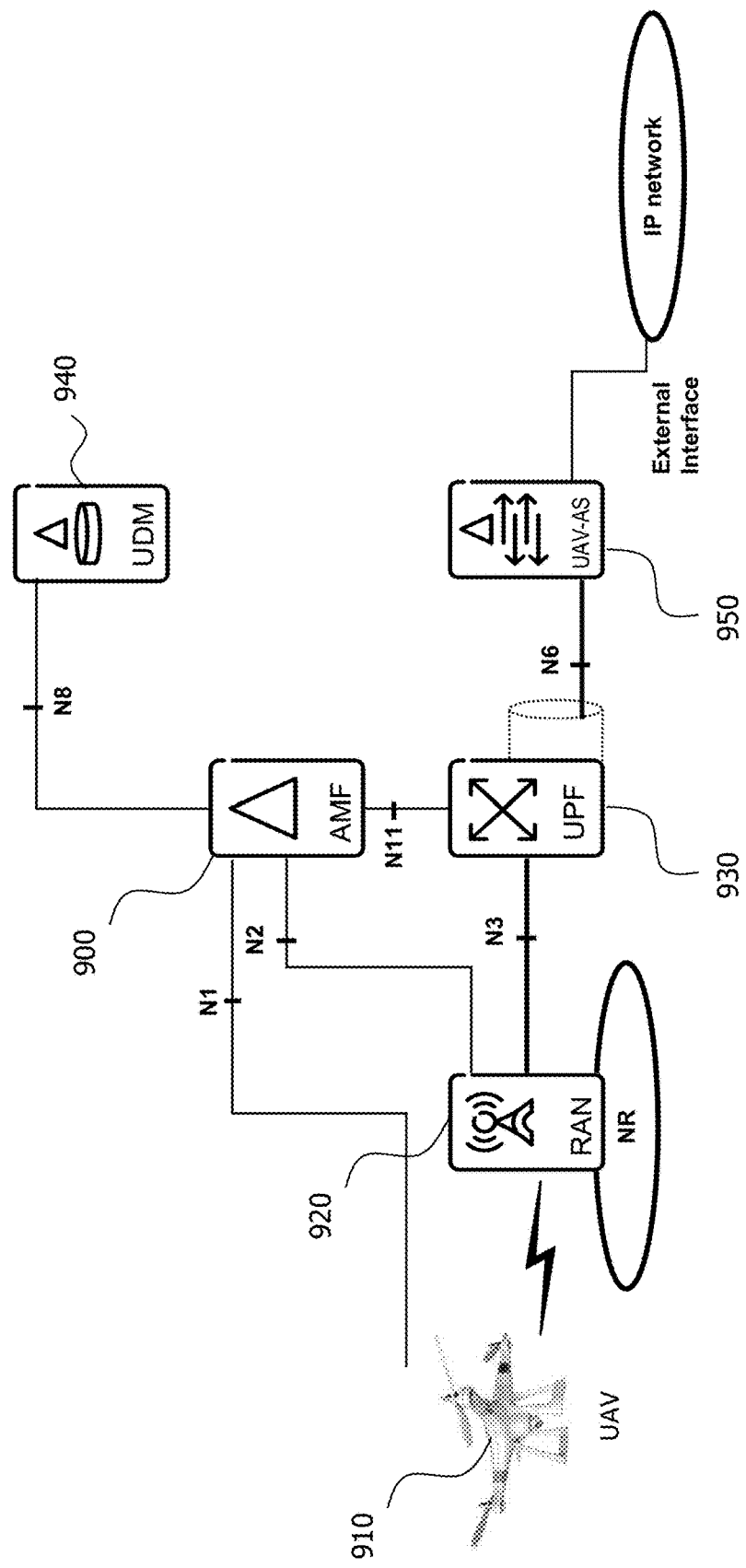

Now referring to FIG. 9, this figure illustrates exemplary cellular network architectures for 5G including a UAV and UAV-AS, which may be used according to the present disclosure.

The architecture shown in FIG. 9 corresponds to a 5G variant of the architecture described in relation to FIG. 8. The basic principles for practicing the technique presented herein may equally apply to the 5G architecture of FIG. 9. Unnecessary repetitions are thus omitted in the following. Only, it is noted that the functions described above for the eNodeB, the MME, the PDN GW and the HSS may in this case be performed by corresponding functions of the 5G architecture, i.e., the Radio Access Network, RAN, 120, the Access and Mobility Function, AMF, 100, the User Plane Function, UPF, 130, and the User Data Management, UDM, 140, respectively.

According to another embodiment, a computer program is provided. The computer program may be executed by the computing units 600 and/or 650 of the above mentioned entities UAV-AS and superior/root UAV-AS respectively such that a method for handling flight policies determination at roaming as described above with reference to FIG. 4a, 4b or 5 may be carried out or be controlled. In particular, the entities UAV-AS and superior/root UAV-AS may be caused to operate in accordance with the above described method by executing the computer program.

The computer program may be embodied as computer code, for example of a computer program product. The computer program product may be stored on a computer readable medium, for example a disk or the storing unit 620 and/or 670 of the UAV-AS and superior/root UAV-AS, or may be configured as downloadable information.

One or more embodiments as described above may enable at least one of the following technical effects:

Supervision of the flight of a UAV and determination, that a UAV is about to leave the current service area towards a target service are where a particular flight policy is applicable.

Determination of a flight policy applicable for the service area the UAV is about to enter, and instructing the flight policy to the UAV before the UAV is leaving the current service are.

In order to minimize the time required to retrieve the flight policy from the target UAV-AS, a UAV-AS determines the responsible neighboring UAV-AS in advance, for example already during a registration phase at start-up of the UAV-AS. This makes this method well suited for UAV flying with higher speeds.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method implemented by a first unmanned aerial vehicle application server (UAV-AS), for determining a flight policy to be applied to an unmanned aerial vehicle (UAV) located in a first geographical service area associated with the first UAV-AS; the method comprising the first UAV-AS:
    determining whether the UAV is going to leave the first geographical service area towards a second geographical service area, wherein the second geographical service area is associated with a second UAV-AS;
    querying a flight policy applicable for the second geographical service area from the second UAV-AS; and
    instructing the flight policy applicable for the second geographical service to the UAV, before the UAV has entered the second geographical service area.

2. The method of claim 1, wherein a flight policy comprises restrictions in respect of operation and/or movement of the UAV.

3. The method of claim 1:
    wherein the UAV is residing in a cellular network comprising a plurality of radio coverage areas; and
    wherein each of the first and second geographical service areas are composed of one or more radio coverage areas used in the cellular network.

4. The method of claim 1, wherein the first UAV-AS instructs the UAV by providing flight instructions corresponding to the flight policy to the UAV.

5. The method of claim 1, wherein the first UAV-AS determines the second geographical service area based on flight path information applicable for the UAV.

6. The method of claim 5, wherein the first UAV-AS receives the flight path information applicable for the UAV from the UAV.

7. The method of claim 5, wherein the first UAV-AS receives the flight path information applicable for the UAV from an operator operating the UAV.

8. The method of claim 1, further comprising the first UAV-AS determining the second UAV-AS by performing a neighbor discovery before the UAV has entered the second geographical service area.

9. The method of claim 8, wherein the neighbor discovery is a look-up in a database comprising information on the association of a UAV-AS with a geographical service area.

10. The method of claim 8:
wherein a plurality of UAV-AS are arranged in a hierarchical structure comprising a subordinate layer and at least one superior layer, a superior layer being a subordinate layer to a next higher superior layer, the subordinate layer comprising a plurality of UAV-AS acting as subordinate UAV-AS, the superior layer comprising one or more UAV-AS acting as superior UAV-AS, wherein the UAV-AS are arranged in the hierarchical structure such that each subordinate UAV-AS is tied to one superior UAV-AS; and
wherein the neighbor discovery is a query for a list of neighboring UAV-AS from the superior UAV-AS tied to the first UAV-AS.

11. The method of claim 10, wherein a subordinate UAV-AS establishes the association of the subordinate UAV-AS with a geographical service area by registering itself towards a superior UAV-AS by indicating a geographical service area the subordinate UAV-AS is handling the flight policy for.

12. The method of claim 10:
wherein the first UAV-AS performs the neighbor discovery as a part of the registration of the first UAV-AS with a superior UAV-AS, further comprising:
receiving, at a first UAV-AS a list of neighboring UAV-AS from the superior UAV-AS, the list comprising an indication of the associated geographical service area for each neighboring UAV-AS.

13. The method of claim 1, further comprising the first UAV-AS:
receiving a request for a flight policy for the geographical service area;
determining the flight policy for the own geographical service area; and
returning the flight policy for the own geographical service area.

14. A method, implemented by an unmanned aerial vehicle application server (UAV-AS) acting as a superior UAV-AS, for determining a flight policy to be applied to an unmanned aerial vehicle (UAV); wherein a plurality of UAV-AS are arranged in a hierarchical structure comprising a subordinate layer and at least one superior layer; the subordinate layer comprising a plurality of UAV-AS acting as subordinate UAV-AS in different geographical areas; the superior layer comprising one or more UAV-AS acting as superior UAV-AS; wherein each subordinate UAV-AS is tied to one superior UAV-AS; the method comprising the superior UAV-AS:
receiving a request from a subordinate UAV-AS, wherein the request comprises an indication of a geographical service area the subordinate UAV-AS is maintaining a flight policy for;
determining a list of subordinate UAV-AS that are tied to geographical service areas that are neighboring to the received geographical service area; and
returning the determined list of subordinate UAV-AS to the requesting subordinate UAV-AS, thereby enabling the requesting subordinate UAV-AS to query a flight policy from any of the subordinate UAV-AS on the list.

15. The method of claim 14, wherein the request is a request for registering the requesting UAV-AS as a subordinate UAV-AS to the superior UAV-AS.

16. The method of claim 14, further comprising the superior UAV-AS:
sending, in response to the superior UAV-AS being tied as a subordinate UAV-AS to a further superior UAV-AS on a next higher hierarchy layer, a request to the further superior UAV-AS for a list of subordinate UAV-AS that are tied to geographical service areas that are neighboring to the received geographical service area; and
receiving, as a response from the further superior UAV-AS, a list of UAV-AS that are tied to geographical service areas that are neighboring to the received geographical service area.

17. A first unmanned aerial vehicle application server (UAV-AS) for determining a flight policy to be applied to an unmanned aerial vehicle (UAV) located in a first geographical area associated with the first UAV-AS; the UAV-AS comprising:
processing circuitry;
memory containing instructions executable by the processing circuitry whereby the UAV-AS is operative to:
determine whether the UAV is going to leave the first geographical service area towards a second geographical service area, wherein the second geographical service area is associated with a second UAV-AS;
query a flight policy applicable for the second geographical service area from the second UAV-AS; and
instruct the flight policy applicable for the second geographical service to the UAV, before the UAV has entered the second geographical service area.

18. The UAV-AS of claim 17, wherein the instructions are such that the first UAV-AS is operative to determine the second UAV-AS by performing a neighbor discovery before the UAV has entered the second geographical service area.

19. An unmanned aerial vehicle application server (UAV-AS) acting as a superior UAV-AS for determining a flight policy to be applied to an unmanned aerial vehicle (UAV); wherein a plurality of UAV-AS are arranged in a hierarchical structure comprising a subordinate layer and at least one superior layer; the subordinate layer comprising a plurality of UAV-AS acting as subordinate UAV-AS in different geographical areas; the superior layer comprising one or more UAV-AS acting as superior UAV-AS; wherein each subordinate UAV-AS is tied to one superior UAV-AS; the superior UAV-AS comprising:
processing circuitry;
memory containing instructions executable by the processing circuitry whereby the superior UAV-AS is operative to:
receive a request from a subordinate UAV-AS, wherein the request comprises an indication of a geographical service area the subordinate UAV-AS is maintaining a flight policy for;
determine a list of subordinate UAV-AS that are tied to geographical service areas that are neighboring to the received geographical service area; and returning the determined list of subordinate UAV-AS to the requesting subordinate UAV-AS, thereby enabling the requesting subordinate UAV-AS to query a flight policy from any of the subordinate UAV-AS on the list.

20. The superior UAV-AS of claim 19, wherein the request is a request for registering the requesting UAV-AS as a subordinate UAV-AS to the superior UAV-AS.

* * * * *